March 3, 1931.　　A. W. MAGNUSON　　1,794,699
HAY FORK
Filed April 15, 1930
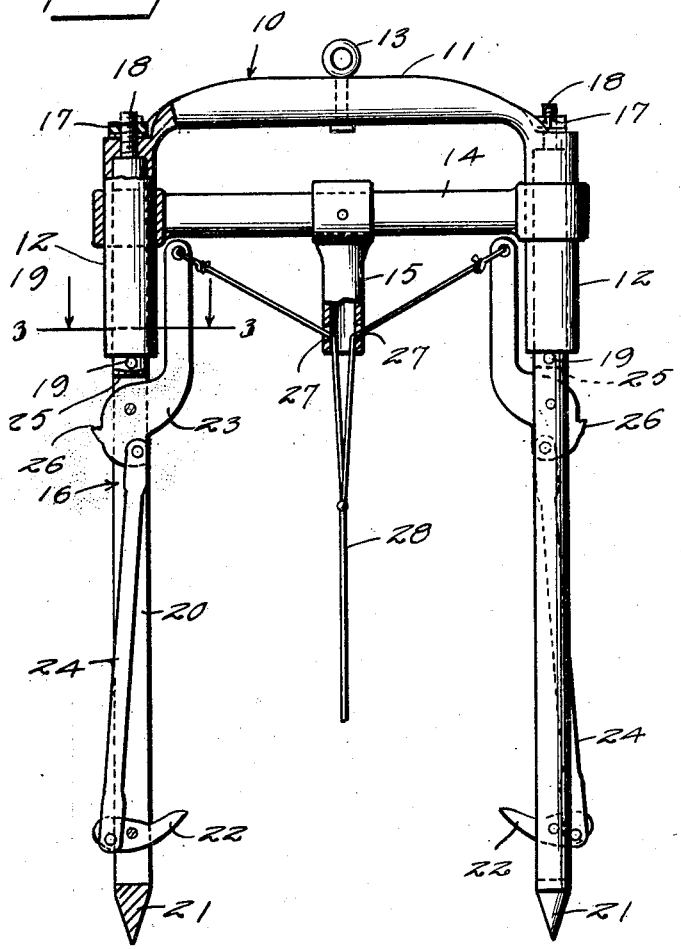
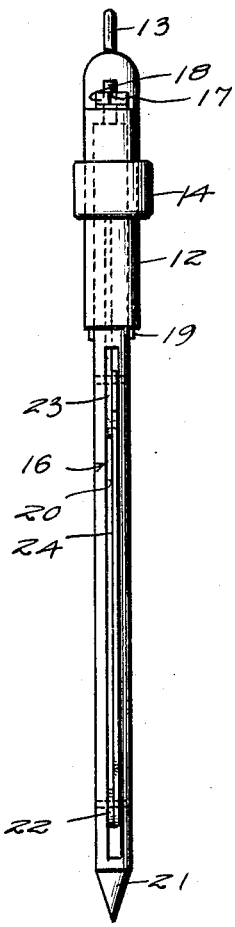
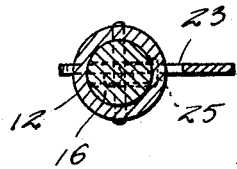
Inventor
A. W. Magnuson
By Watson E. Coleman
Attorney Patented Mar. 3, 1931

1,794,699

UNITED STATES PATENT OFFICE

ANDREW W. MAGNUSON, OF STOCKHOLM, MAINE

HAY FORK

Application filed April 15, 1930. Serial No. 444,507.

This invention relates to hay forks and more particularly to a hay fork which is adapted for use in storing hay in barns or in loading hay on vehicles or the like.

An object of this invention is to provide a hay fork which is so constructed that it may be readily inserted into a quantity of hay and when in position may be locked so as to clamp or grip an exceedingly large quantity of hay.

Another object of this invention is to provide a hay fork having a pair of pivoted tines so that the tines may be forced into the hay in a rotary or drilling movement thereby permitting the fork to grab a greater quantity of hay than is possible with the hay forks at present available.

A further object of this invention is to provide a hay fork of this character which may be tripped at any desired point so as to release the hay therefrom.

The above and various other objects and advantages of this invention will in part be described in and in part be understood from the following detailed description of the present preferred embodiment, the same being illustrated in the accompanying drawing wherein:—

Figure 1 is a detail side elevation partly in section of a hay fork constructed according to the preferred embodiment of this invention;

Figure 2 is a detail end elevation of the device; and

Figure 3 is a sectional view taken on the line 3—3 of Figure 1.

Referring to the drawing wherein like numerals of reference designate corresponding parts throughout the several views, the numeral 10 designates generally a frame which comprises a cross bar 11 upon the ends of which are positioned depending tubular members 12, and an eyelet 13 is swiveled in the cross bar 11 at substantially the center thereof, the eyelet 11 being adapted to be connected to a cable or rope which is used in lifting the hay for transportation to the desired position.

A horizontal brace 14 is secured to the vertically disposed members 12 at a point spaced downwardly from the cross bar 11 and a depending lug 15 is secured to the brace member 14 at a point in substantial alignment with the eyelet 13. A pair of tines 16 are rotatably positioned in the tubular members 12, the tines 16 being provided with a threaded upper end portion 17 for reception of a nut 18 or the like and the tines 16 are also provided with stop members 19 which are adapted to rotatably engage the lower end portion of the tubular members 12 so as to prevent longitudinal movement of the tines 16 in the tubular members 12. The tines 16 are provided with a longitudinally disposed slit 20 which extends substantially throughout the length of the tines and terminates at a point spaced upwardly from the lower ends of the tines, the lower ends of the tines terminating in a point 21.

A rockable locking member 22 is secured to each of the tines 16 and is positioned in the slot 20 adjacent the bottom thereof, and an operating lever 23 is rockably positioned in the slot 20 of each of the tines adjacent the upper end portion thereof, and a link or connecting bar 24 is connected at one end to the operating lever 23 and at the opposite end to the locking member 22.

A stop 25 is positioned in the slot 20 for engagement by the upper end of the link member 24 so as to limit the rocking movement of the link member, and the operating lever 23 is also provided with a stop lug 26 so as to limit the rocking movement of the operating member. The depending lug 15 is provided with apertures 27 for reception of a flexible cord 28 or the like which is secured at one end to the operating lever 23 and the opposite end is free so that it may be pulled at a point remote from the hay fork so as to release the hay positioned on the fork.

In the operation of this device, when it is desired to insert the fork into a quantity of hay, the operating levers 23 are swung downwardly into a substantially horizontal position whereupon they may be grasped and rotated upon the frame of the fork so as to permit the insertion of the tines 16 into the hay. When the operating levers 23 are in substantially horizontal position, the locking members 22 will be rocked so that they will be positioned in substantial alignment with the tines 16 and substantially entirely contained within the slot 20 so as not to impede the downward movement of the tines in the hay.

When the fork has been inserted into the hay for the desired distance or to the depth of the frame, the operating levers 23 may be swung upwardly so as to be positioned in substantially vertical position or in parallel relation to the tines 16. When the operating levers 23 are substantially parallel with the tines 16, the locking members 22 will be swung outwardly of the tines 16 and at substantially right angles thereto so that when the fork is lifted upwardly, the hay will be held on the fork by the locking members 22. The fork may then be moved to the desired point whereupon the tripping cord 28 may be pulled thereby swinging the operating members 23 into substantially horizontal position which cooperatively will swing the locking members 22 back into the slots 20 of the tines and permitting the hay to drop or be released from the fork.

It will be obvious from the foregoing that an exceedingly simple hay fork has been provided by means of which the tines may be forced into the hay in a substantially drilling movement which permits the tines to be inserted into the hay for a greater distance than is possible where the tines are fixedly secured to the frame as in most of the hay forks at present available. While I have shown merely apertures in the depending centrally disposed lug member 15 through which the tripping cord 28 is adapted to pass, I do not wish to be limited to this construction as a pulley or other member may be secured to the lug 15 so as to facilitate the tripping of the operating levers 23.

While the frame 10 and the tines 16 have been disclosed as being formed of material which is round or annular in cross section, I of course do not wish to be limited to this construction as the frame member 10 and the tines 16 may be formed of material of any other configuration such as flat bars of metal suitably welded or bolted together, the frame 10 being provided at the opposite sides thereof with tubular bearing members 12 and the tines having rounded upper end portions adapted for rotation within the tubular bearings 12.

It will, of course, be understood that various changes and modifications may be made in the details of construction and design of the specifically described embodiment of this invention without departing from the spirit thereof, such changes and modifications being restricted only by the scope of the following claims.

What is claimed is:—

1. A hay fork of the character described comprising a frame and a pair of tines swivelly secured to said frame.

2. A hay fork of the character described comprising a frame, said frame having an upper cross bar, a pair of depending tubular bearing members secured to the opposite ends of said cross bar, bracing means for said tubular members, and a tine rotatably positioned in each of said tubular members.

3. A hay fork of the character described comprising a frame having a pair of spacedly positioned tubular members, tines rotatably positioned in said tubular members, and releasable locking means positioned in said tines whereby to releasably lock a quantity of hay thereupon.

4. A hay fork of the character described comprising a frame and a pair of tines rotatably mounted in said frame, said tines comprising an elongated toothed member having a longitudinally disposed slot therein, a hay locking member rotatably mounted in one end of each tine, an operating member mounted in said slot, link means connecting said operating member with said hay locking member, a stop positioned in said slot of each tine whereby to limit the movement of said link, stop means carried by said operating lever whereby to limit the rocking movement thereof, and a releasable cord secured to each of said operating levers.

In testimony whereof I hereunto affix my signature.

ANDREW W. MAGNUSON.